US011910282B2

(12) United States Patent
Oshima et al.

(10) Patent No.: US 11,910,282 B2
(45) Date of Patent: Feb. 20, 2024

(54) ROADSIDE COMMUNICATION DEVICE AND ROAD-TO-VEHICLE COMMUNICATION METHOD

(71) Applicant: Mitsubishi Electric Corporation, Tokyo (JP)

(72) Inventors: Tadashi Oshima, Tokyo (JP); Nobuhiro Suzuki, Tokyo (JP); Yoshiaki Tsuda, Tokyo (JP); Takafumi Yokoe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 340 days.

(21) Appl. No.: 17/497,696

(22) Filed: Oct. 8, 2021

(65) Prior Publication Data

US 2022/0030401 A1    Jan. 27, 2022

Related U.S. Application Data

(63) Continuation of application No. PCT/JP2019/016167, filed on Apr. 15, 2019.

(51) Int. Cl.
*H04W 4/44* (2018.01)
*G01S 3/46* (2006.01)
*G01S 3/48* (2006.01)

(52) U.S. Cl.
CPC ............... *H04W 4/44* (2018.02); *G01S 3/46* (2013.01); *G01S 3/48* (2013.01)

(58) Field of Classification Search
CPC ............... H04W 4/44; G01S 3/46; G01S 3/48
See application file for complete search history.

(56) References Cited

U.S. PATENT DOCUMENTS

| | | | | |
|---|---|---|---|---|
| 2018/0031671 | A1* | 2/2018 | Alexander | ............ G01S 5/0072 |
| 2020/0174093 | A1* | 6/2020 | Ono | ............ G01S 3/48 |
| 2020/0400776 | A1* | 12/2020 | Sotoyama | ............ G01S 5/02 |

FOREIGN PATENT DOCUMENTS

| | | |
|---|---|---|
| JP | 2003-30699 A | 1/2003 |
| JP | 2007-243316 A | 9/2007 |
| JP | 2012-247958 A | 12/2012 |
| JP | 5697541 B2 | 4/2015 |
| JP | 2016-61686 A | 4/2016 |

OTHER PUBLICATIONS

Hattori, "Control Methods for Providing Steady Services under Mixed Traffic of Broadcast and Individual Links on Road to Vehicle Communication", IPSJ Journal, vol. 53 No. 1, pp. 175-183, Jan. 2012.

(Continued)

*Primary Examiner* — Junpeng Chen
(74) *Attorney, Agent, or Firm* — Birch, Stewart, Kolasch & Birch, LLP

(57) ABSTRACT

Determination is made as to whether or not to enable communications by a communication processing unit with an on-board unit, on the basis of a receive strength detected from a radio wave received via a communication antenna, and the angle of arrival and the receive strength of a direct wave and the angle of arrival and the receive strength of a reflected wave, the angles of arrival and the receive strengths being estimated from one or more radio waves received via an angle measurement antenna.

6 Claims, 7 Drawing Sheets

(56) References Cited

OTHER PUBLICATIONS

International Search Report dated Jul. 16, 2019 in PCT/JP2019/016167 filed Apr. 15, 2019.
Japanese Office Action dated Dec. 3, 2019 in Japanese Patent Application No. 2019-554949.
Krim et al., "Two decades of array signal processing research", IEEE Signal Processing Magazine, vol. 13 No. 4, pp. 67-94, Jul. 1996.
Sakai et al., "Electromagnetic wave absorber technology and its applications for ETC", Mitsubishi Cable Industries newsletter, No. 106, pp. 25-29, Oct. 2009.
Zoltowski et al., "Closed-Form 2-D Angle Estimation with Rectangular Arrays in Element Space or Beamspace via Unitary ESPRIT", IEEE Transactions on Signal Processing, vol. 44, No. 2, pp. 316-328, Feb. 1996.

\* cited by examiner

FIG. 3
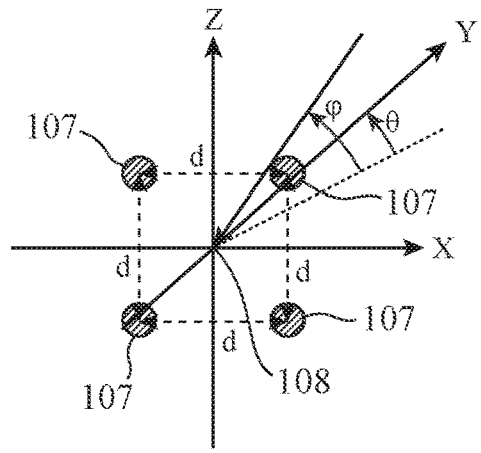
FIG. 4A
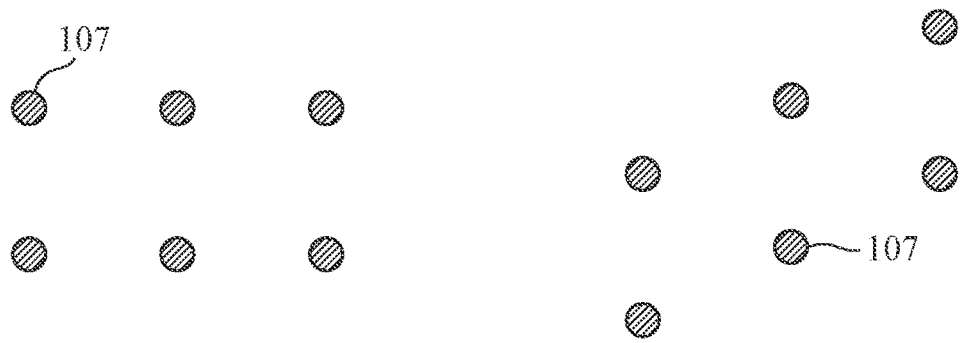
FIG. 4B
FIG. 4C
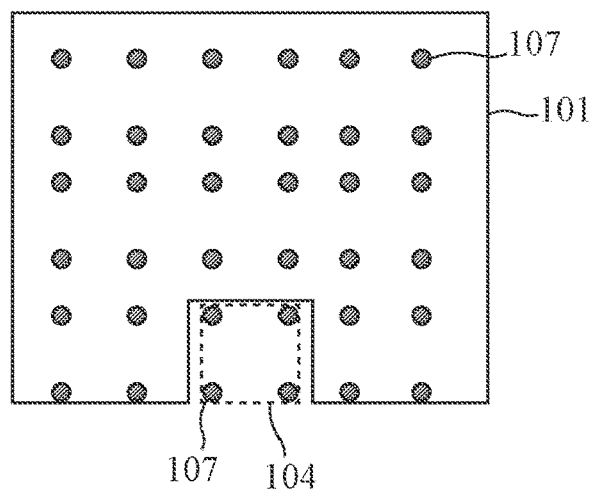

ROADSIDE COMMUNICATION DEVICE AND ROAD-TO-VEHICLE COMMUNICATION METHOD

CROSS REFERENCE TO RELATED APPLICATION

This application is a Continuation of PCT International Application No. PCT/JP2019/016167, filed on Apr. 15, 2019, which is hereby expressly incorporated by reference into the present application.

TECHNICAL FIELD

The present disclosure relates to a roadside communication device and a road-to-vehicle communication method.

BACKGROUND ART

In road-to-vehicle communication systems such as electronic toll control (ETC: registered trademark) systems, various pieces of information are transmitted and received between an on-board unit mounted in a vehicle travelling along a road and a roadside communication device installed on the roadside. When the received signal strength indicator (abbreviated as the RSSI hereinafter) of a radio wave sent out from an on-board unit exceeds a reference value, the roadside communication device establishes communications with the on-board unit. Therefore, when an RSSI of a radio wave transmitted from another on-board unit which is present in the vicinity of the on-board unit to be communicated with and is not a target for communications exceeds the reference value, there is a possibility that the roadside communication device erroneously communicates with the other on-board unit which is not the target for communications.

To solve this problem, for example, in Patent Literature 1, an information processing device including a direction specification antenna for specifying the angle of arrival of a radio wave in addition to a communication antenna used for communications with an on-board unit is described. This information processing device estimates the angle of arrival of a radio wave received by a direction specification antenna, and determines whether or not an on-board unit which is the transmission source of the radio wave is mounted in a vehicle traveling along a target lane, on the basis of the estimated angle of arrival.

CITATION LIST

Patent Literature

Patent Literature 1: JP 2012-247958 A

SUMMARY OF INVENTION

Technical Problem

A radio wave transmitted from an on-board unit may experience multipath reflections by a vehicle or a building in the surroundings. Because the information processing device described in Patent Literature 1 does not take into consideration a radio wave that is received as a reflected wave, the information processing device involves a problem that the angle of arrival of a radio wave transmitted from an on-board unit cannot be estimated correctly when a direct wave of a radio wave is received in a mixed state with reflected waves. There is a possibility that erroneous communications with an on-board unit which is not the target for communications are performed when the angle of arrival of a radio wave cannot be estimated correctly.

The present disclosure is made to solve the above-mentioned problem, and it is therefore an object of the present disclosure to provide a roadside communication device and a road-to-vehicle communication method capable of avoiding erroneous communications with an on-board unit which is not the target for communications.

Solution to Problem

According to the present disclosure, there is provided a roadside communication device connected to a first antenna used for communications with an on-board unit, and to a second antenna used for estimating angles of arrival of radio waves, the roadside communication device including: processing circuitry to detect a receive strength of a radio wave received via the first antenna from a first on-board unit; to estimate an angle of arrival and a receive strength of a direct wave and an angle of arrival and a receive strength of a reflected wave, the direct wave and the reflected wave being included in one or more radio waves received via the second antenna from one or more on-board units; and to determine whether or not to enable communications with the first on-board unit, using the first antenna, on a basis of the detected receive strength, and the estimated angles of arrival and the estimated receive strengths of the direct and reflected waves of the one or more radio waves, wherein if the detected receive strength exceeds a reference value, and if the estimated angle of arrival of either the direct wave or reflected wave of the radio wave shows an arrival from a communication area, then the processing circuitry determines that communications with the first on-board unit are enabled.

Advantageous Effects of Invention

According to the present disclosure, whether or not enable communications with an on-board unit via the first antenna is determined on the basis of the receive strength detected from a radio wave received via the first antenna, and the angles of arrival and the receive strengths of the direct and reflected waves of the one or more radio waves, the angles of arrival and the receive strengths being estimated from the one or more radio waves received via the second antenna. As a result, even when radio waves transmitted from on-board units are received in a state where direct waves and reflected waves are mixed, erroneous communications with on-board units which are not a target for communications can be avoided.

BRIEF DESCRIPTION OF DRAWINGS

FIG. 3 is a diagram showing the arrangement of element antennas in an array antenna;

FIG. 4A is a diagram showing a variant 1 of the arrangement of the element antennas in the array antenna;

FIG. 4B is a diagram showing a variant 2 of the array of element antennas in the array antenna;

FIG. 4C is a diagram showing the configuration of a communication antenna and an angle measurement antenna in the array antenna;

DESCRIPTION OF EMBODIMENTS

Embodiment 1

Figure 1:
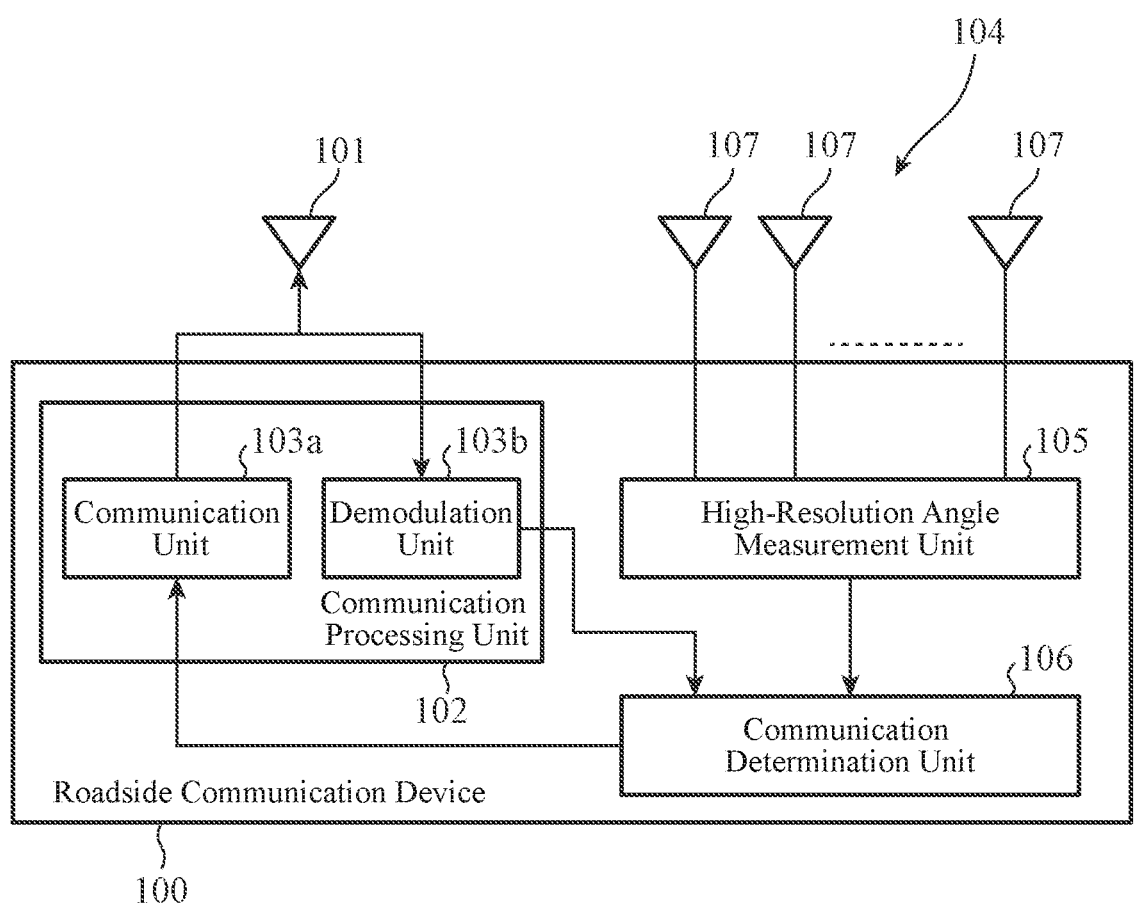
FIG. 1 is a block diagram showing the configuration of a roadside communication device according to Embodiment 1.

FIG. 1 is a block diagram showing the configuration of a roadside communication device 100 according to Embodiment 1. The roadside communication device 100 is disposed in the roadside, and communicates with an on-board unit mounted in a vehicle. Conventionally, radio waves transmitted from on-board units other than a target for communications are absorbed typically by an electromagnetic wave absorber. Contrastingly, the roadside communication device 100 determines whether or not to enable communications with an on-board unit, using an angle of arrival and a receive strength of a direct wave and an angle of arrival and a receive strength of a reflected wave of radio waves transmitted from on-board units. Therefore, the roadside communication device 100 can avoid erroneous communications with on-board units other than the target for communications, without using an electromagnetic wave absorber for absorbing a radio wave transmitted from on-board units other than the target for communications.

A communication antenna 101 is a first antenna used for communications with on-board units, and is connected to a communication unit 103a and a demodulation unit 103b which are included in a communication processing unit 102. For example, a radio wave including a communication control information channel and service information is transmitted to on-board units via the communication antenna 101, and response signals from on-board units are received. The communication control information channel is a frame control message channel (FCMC), and the service information is a beacon service table (BST). Furthermore, a response signal from an on-board unit includes an activation channel (ACTC) and a vehicle service table (VST).

The communication processing unit 102 detects a receive strength of a radio wave received via the communication antenna 101 from an on-board unit. Furthermore, when a communication determination unit 106 determines that communications with an on-board unit are enabled, the communication processing unit 102 communicates with the on-board unit using the communication antenna 101. The communication processing unit 102 includes the communication unit 103a and the demodulation unit 103b. The communication unit 103a modulates a transmission signal, performs frequency conversion on the modulated transmission signal, and amplifies the transmission signal on which the frequency conversion is performed, on the basis of information about the FCMC. The transmission signal on which these processes are performed is outputted from the communication unit 103a to the communication antenna 101, and is transmitted toward on-board units via the communication antenna 101.

The demodulation unit 103b demodulates a radio wave received via the communication antenna 101 from an on-board unit and analyzes the demodulated radio wave to detect the on-board unit ID and the receive strength of the radio wave. The demodulation unit 103b outputs the detected on-board unit ID and the detected receive strength of the radio wave to the communication determination unit 106. The on-board unit ID is information which is assigned to the on-board unit, which is the transmission source of the radio wave, to identify the on-board unit, and which is specific to the on-board unit. For example, the on-board unit ID is included in the ACTC transmitted from the on-board unit to the roadside communication device 100. Furthermore, the receive strength of the radio wave is the RSSI of the radio wave received from the on-board unit.

An angle measurement antenna 104 is a second antenna used for estimating the angle of arrival of a radio wave received from an on-board unit, and is connected to a high-resolution angle measurement unit 105. The angle measurement antenna 104 is an array antenna, and includes multiple element antennas 107.

The high-resolution angle measurement unit 105 estimates the angle of arrival and the receive strength of a direct wave and the angle of arrival and the receive strength of a reflected wave, the direct and reflected waves being included in a radio wave received via the angle measurement antenna 104 from an on-board unit. The high-resolution angle measurement unit 105 demodulates a radio wave received, via the angle measurement antenna 104, from an on-board unit, and detects the on-board unit ID from the demodulated radio wave. Furthermore, the high-resolution angle measurement unit 105 separates the demodulated radio wave into a direct wave and a reflected wave. The high-resolution angle measurement unit 105 then estimates a horizontal angle and a vertical angle of the direct wave, and also estimates a horizontal angle and a vertical angle of the reflected wave. Each of the horizontal and vertical angles shows the angle of arrival of the radio wave. In addition, the high-resolution angle measurement unit 105 estimates the receive strength of the direct wave and the receive strength of the reflected wave. Hereinafter, estimated values of the horizontal and vertical angles of the radio wave are described as "angle measurement values" as needed. Furthermore, an estimated value of the receive strength of the radio wave is described as an "estimated value of radio wave strength." The high-resolution angle measurement unit 105 outputs the on-board unit ID, the angle measurement values and the estimated value of radio wave strength of the direct wave, and the angle measurement values and the estimated value of radio wave strength of the reflected wave to the communication determination unit 106.

The communication determination unit 106 determines whether or not to enable communications by the communication processing unit 102 with the on-board unit using the communication antenna 101, on the basis of the receive strength detected by the communication processing unit 102, and the angles of arrival and the receive strengths of the direct and reflected waves of the radio wave, the angles of arrival and the receive strengths being estimated by the high-resolution angle measurement unit 105. For example, if the receive strength of the radio wave detected by the demodulation unit 103b exceeds a threshold, and if the angle measurement value of either the direct wave or reflected wave of the radio wave, the angle measurement value being estimated by the high-resolution angle measurement unit 105, shows an arrival from a communication area, the communication determination unit 106 determines that communications with the on-board unit are enabled.

Figure 2:
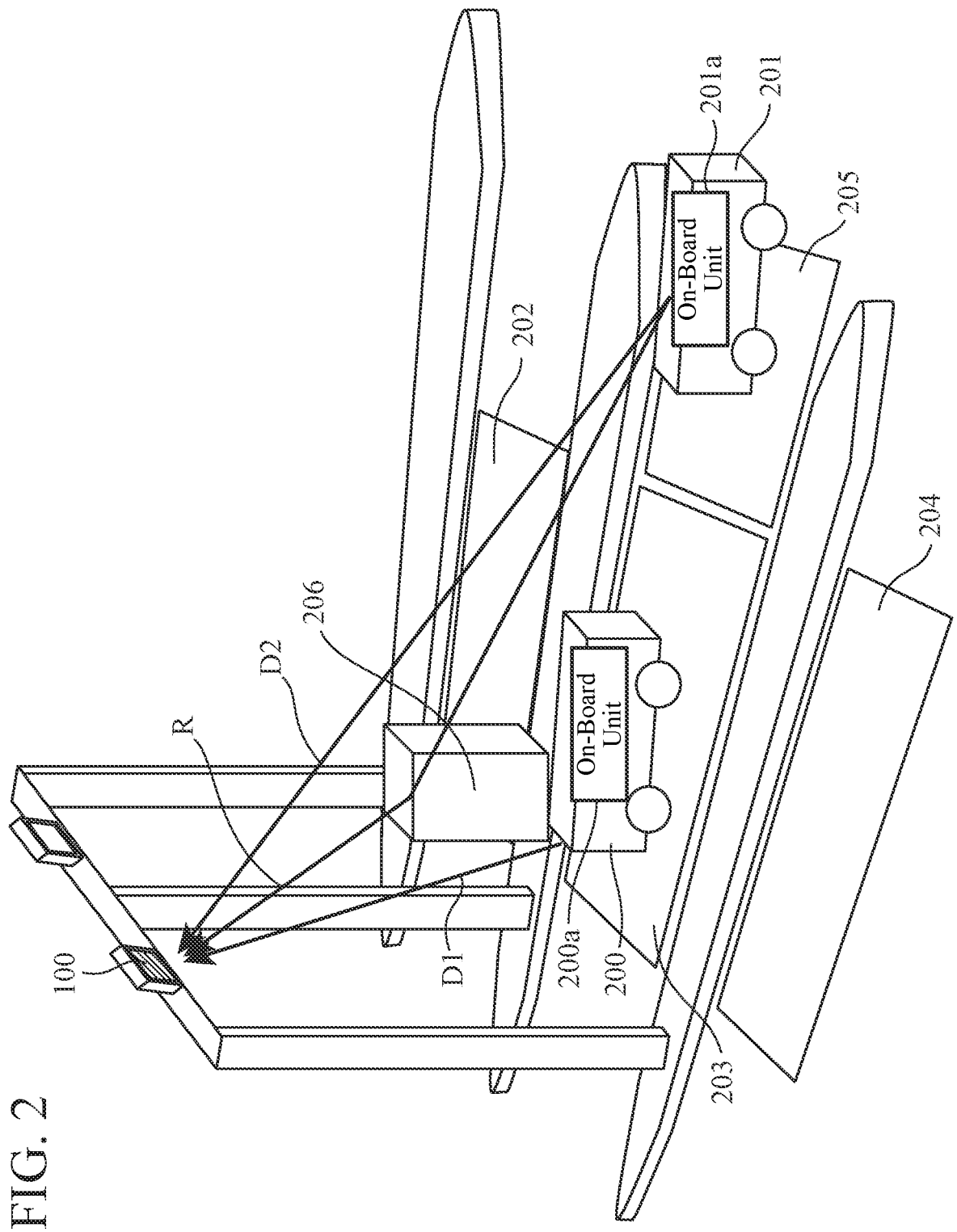
FIG. 2 is an outline diagram showing an overview of a road-to-vehicle communication system including the roadside communication device of FIG. 1.

FIG. 2 is an outline diagram showing an overview of a road-to-vehicle communication system including the roadside communication device 100. The road-to-vehicle communication system shown in FIG. 2 is disposed in an ETC (registered trademark) tollgate, and includes the roadside communication device 100. A vehicle 200 is traveling along one of two lanes passing through this tollgate, and another vehicle 201 is traveling after the vehicle 200. The roadside communication device 100 can receive a radio wave from an on-board unit present in any of areas 202 to 205. Furthermore, the tollgate has a gate on which the roadside communication device 100 is disposed, and a booth 206 disposed in the vicinity of the gate.

For example, for the roadside communication device 100, an on-board unit 200a mounted in the vehicle 200 present in the area 203 that is the communication area is the target for communications. However, when the vehicle 201 enters the area 205 behind the area 203, the roadside communication device 100 can receive a direct wave D2 of a radio wave transmitted from an on-board unit 201a mounted in the vehicle 201 and a reflected wave R which is reflection by the booth 206 of the radio wave transmitted from the on-board unit 201a, in addition to a direct wave D1 of a radio wave transmitted from the on-board unit 200a. Therefore, when the RSSI of either the direct wave D2 or the reflected wave R exceeds the threshold, the roadside communication device 100 may perform erroneous communications with the on-board unit 201a which is not the target for communications.

For example, because radio waves each transmitted from an on-board unit and including an ACTC are fundamentally transmitted in a time division manner for each on-board unit, radio waves from multiple on-board units do not interfere with one another. Conventional roadside communication devices estimate the angle of arrival of a radio wave received from an on-board unit and including an ACTC and determine whether the on-board unit is present in the area 203 on the basis of the estimated angle of arrival. However, when the direct wave D2 and the reflected wave R of a radio wave transmitted from the on-board unit 201a which is not the target for communications are received in a state where the direct and reflected waves are mixed, as shown in FIG. 2, conventional roadside communication devices cannot correctly estimate the angle of arrival of the radio wave.

Accordingly, the roadside communication device 100 separates a radio wave received via the angle measurement antenna 104 into a direct wave D2 and a reflected wave R, and estimates the angles of arrival of the direct wave D2 and the reflected wave R after separation. As a result, even when a radio wave transmitted from an on-board unit is received in a state where direct and reflected waves are mixed, the roadside communication device 100 can correctly determine whether or not to enable communications with the on-board unit.

The high-resolution angle measurement unit 105 separates a radio wave received via the angle measurement antenna 104 from an on-board unit into a direct wave and a reflected wave, and performs high-resolution angle measurements. As a high-resolution angle measurement method, for example, the MUltiple SIgnal Classification (MUSIC) or the Estimation Signal Parameters via Rotational Invariance Technique (ESPRIT) may be used. These methods are described in detail in Reference Literature 1 below.

(Reference literature 1) H. Krim, M. Viberg, "Two Decades of Array Signal Processing Research", IEEE Signal Processing Magazine, vol. 13, no. 4, pp. 67-94, July 1996.

A direct wave and a reflected wave of a radio wave generally have a high correlation, and are called coherent waves. As a method of separating coherent waves and performing angle measurements, for example, a spatial averaging method or a forward/backward (F/B) averaging method may be used. In the spatial averaging method, for example, by averaging a correlation matrix of a partial array which is part of an array antenna, and a correlation matrix of an array which is the result of translating this partial array, the correlation between the direct wave and the reflected wave is suppressed. Furthermore, in the F/B averaging method, by averaging a correlation matrix of an array antenna before inverted, and a correlation matrix which is the result of inverting this array antenna, the correlation between the direct wave and the reflected wave is suppressed.

To improve the spatial averaging method's effect of suppressing the correlation between the direct wave and the reflected wave, it is desirable to increase the number of element antennas which constitute the array antenna. However, as the number of element antennas is increased, the device scale increases and the amount of arithmetic operation of the angle measurement processing also increases. Accordingly, in the case where an incidence model for two waves including a direct wave and a reflected wave is assumed, the high-resolution angle measurement unit 105 separates a direct wave and a reflected wave of a radio wave using the F/B averaging method, which requires a smaller amount of arithmetic operation than that of the spatial averaging method, and estimates the horizontal angle and the vertical angle of each of the direct and reflected waves.

FIG. 3 is a diagram showing the arrangement of the element antennas 107 in the array antenna, and shows the arrangement of the element antennas 107 in the angle measurement antenna 104. In FIG. 3, the X axis, the Y axis, and the Z axis show a rectangular coordinate system in three-dimensional space, and the negative direction of the Y axis is the traveling direction of the vehicle. In FIG. 3, the multiple element antennas 107 are all located in the X-Z plane. To apply the F/B averaging method, the arrangement of the element antennas 107 in the array antenna needs to be centrosymmetric with respect to an array center 108, as shown in FIG. 3. Furthermore, the spacing d between mutually adjacent element antennas 107 is typically set to substantially half the wavelength of a transmission radio wave.

FIG. 4A is a diagram showing a variant 1 of the arrangement of the element antennas 107 in the array antenna. FIG. 4B is a diagram showing a variant 2 of the arrangement of the element antennas 107 in the array antenna. The array antennas shown in FIGS. 4A and 4B are the angle measurement antenna 104, and six element antennas 107 are arranged in such a way as to be centrosymmetric with respect to the array center.

Furthermore, in FIG. 3, an arrow directed toward the array center 108 is a vector showing a radio wave transmitted from an on-board unit. The high-resolution angle measurement unit 105 estimates the horizontal angle $\theta$ and the vertical angle $\phi$ of the radio wave received via the angle measurement antenna 104. The horizontal angle $\theta$ is the angle of arrival of the radio wave on a horizontal plane, the angle of arrival being defined with respect to the Y axis on the X-Y plane which is the horizontal plane. The horizontal angle θ is equal to the angle which a straight line which is acquired by performing orthogonal projection of the above-mentioned vector showing the radio wave onto the X-Y plane forms with the Y axis. The vertical angle φ is the angle of arrival of the radio wave with respect to the X-Y plane. The vertical angle φ is equal to the angle which the straight line which is acquired by performing orthogonal projection of the above-mentioned vector showing the radio wave onto the X-Y plane forms with the vector.

FIG. 4C is a diagram showing the configuration of the communication antenna 101 and the angle measurement antenna 104 in the array antenna. As shown in FIG. 4C, the communication antenna 101 may be, for example, an array antenna which includes multiple element antennas 107. In the case where the communication antenna 101 is an array antenna, the angle measurement antenna 104 can be constituted by a part of the aperture of the array antenna (e.g., a partial array having four element antennas 107).

The communication antenna used for communications with on-board units is configured in such a way that generally, a beam is formed by combining many element antennas, and it is possible to communicate with a partner in the communication area by using the formed beam. Therefore, as shown in FIG. 4C, even though part of many element antennas 107 is used as the angle measurement antenna 104, the influence on the communication antenna 101 is small. This means that an angle measurement function can be added using the communication antenna which an existing roadside communication device includes. Embodiment 1 is not limited to the embodiment in which the communication antenna 101 and the angle measurement antenna 104 formed by a single array antenna, and an array antenna which constitutes the communication antenna 101 and an array antenna which constitutes the angle measurement antenna 104 may be disposed separately.

Next, a road-to-vehicle communication method using the roadside communication device 100 will be explained.

Figure 5:
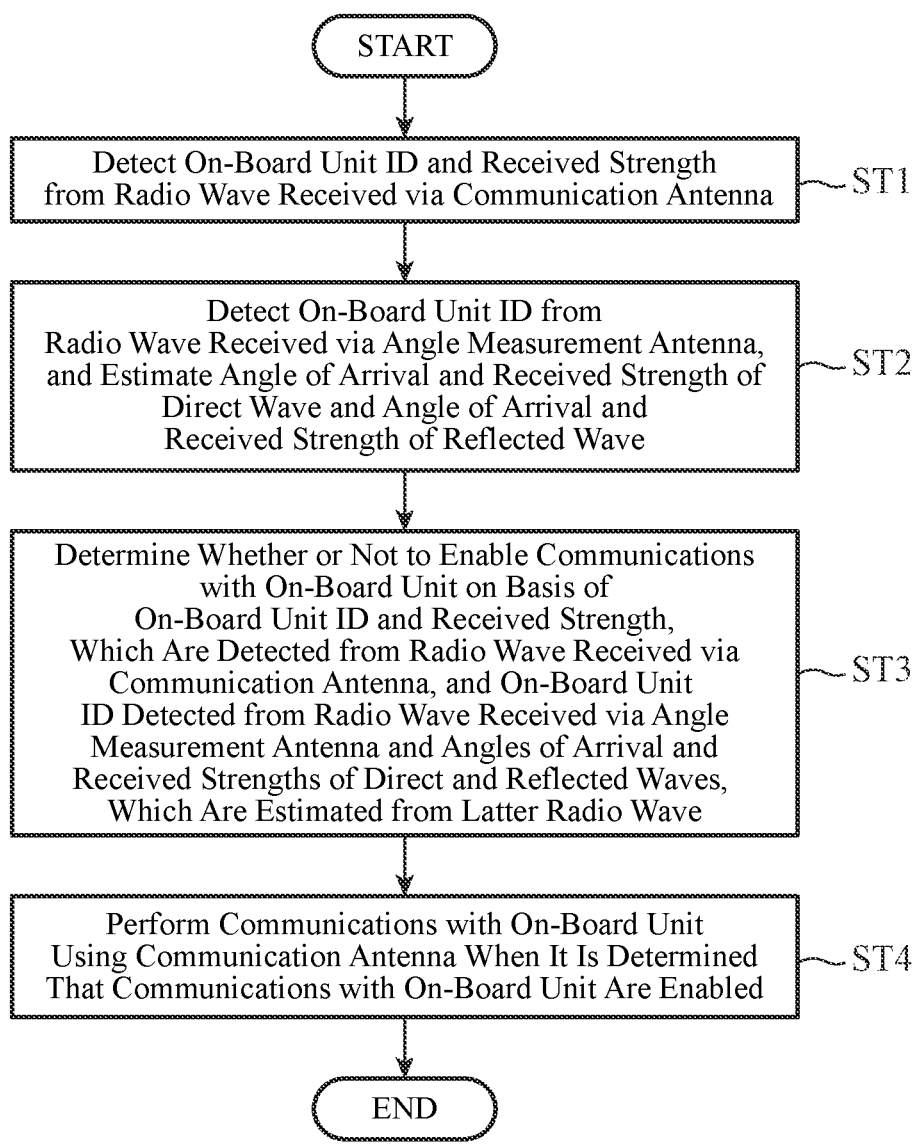
FIG. 5 is a flowchart showing a road-to-vehicle communication method according to Embodiment 1.

FIG. 5 is a flowchart showing the road-to-vehicle communication method according to Embodiment 1, and shows a series of processes by the roadside communication device 100. The demodulation unit 103b demodulates a radio wave received, via the communication antenna 101, from an on-board unit, to detect an on-board unit ID and the receive strength of the radio wave (step ST1). For example, the demodulation unit 103b amplifies an ACTC signal received via the communication antenna 101, passes the signal through a band limiting filter, and performs frequency conversion of the signal to a signal in an intermediate frequency band (described as an IF signal hereinafter). Then, the demodulation unit 103b A/D converts the IF signal into a digital signal and converts the digital signal into a baseband signal, to perform demodulation. The demodulation unit 103b detects an on-board unit ID from the baseband signal and detects the receive strength of the radio wave using the baseband signal.

The high-resolution angle measurement unit 105 demodulates and analyzes a radio wave received via the angle measurement antenna 104, thereby detecting an on-board unit ID and also estimating the angles of arrival and the estimated values of radio wave strength of the direct and reflected waves of the radio wave (step ST2). For example, the high-resolution angle measurement unit 105 amplifies an ACTC signal received, via the angle measurement antenna 104, from an on-board unit, passes the amplified ACTC signal through a band limiting filter, and performs frequency conversion of the ACTC signal which has passed through the band limiting filter into an IF signal. Next, the high-resolution angle measurement unit 105 A/D converts the IF signal into a digital signal and converts the digital signal into a baseband signal, to perform demodulation. The high-resolution angle measurement unit 105 detects an on-board unit ID from the baseband signal.

Next, the high-resolution angle measurement unit 105 performs the high-resolution angle measurement processing on the ACTC signal, to estimate a horizontal angle θ and a vertical angle θ. Hereinafter, an explanation will be made as to a case in which the number of element antennas 107 which constitute the angle measurement antenna 104 is four and an ESPRIT algorithm is adopted as the high-resolution angle measurement method. No limitation is intended to this case, and the angle measurement antenna 104 may include five or more element antennas and MUSIC or CAPON, instead of ESPRIT, may be used as the high-resolution angle measurement method.

Hereinafter, instead of the F/B averaging method, a 2D unitary ESPRIT method will be explained. The 2D unitary ESPRIT method makes it possible to simultaneously estimate the horizontal angle θ and the vertical angle φ of a radio wave using a unitary transformation, and is described in detail in following Reference Literature 2.

(Reference Literature 2) M. D. Zoltowski, M. Haardt and C. P. Mathews, "Closed-Form 2-D Angle Estimation with Rectangular Arrays in Element Space or Beamspace via Unitary ESPRIT", IEEE Trans., vol. SP-44, no. 2, pp. 316-328, February 1996.

The high-resolution angle measurement unit 105 calculates a correlation matrix $R_{xx}$ from the following expression (1) using digital data $x_m(n)$ acquired from the radio wave received via each element antenna 107 of the angle measurement antenna 104. An element number m is a serial number assigned to each element antenna 107, and m=1, 2, 3, ..., and M are assigned to the element antennas 107 in order. Furthermore, a sampling data number n is a serial number assigned to each piece of sampled data, and n=1, 2, ..., and N are assigned to pieces of data in order. x(n) is expressed by the following expression (2). $(\bullet)^T$ is the transpose of a vector or a matrix, and $(\bullet)^H$ is the Hermitian transpose of a vector or a matrix.

$$R_{xx} = \frac{1}{N}\sum_{n=1}^{N} x(n)x^H(n) \quad (1)$$

$$x(n) = [x_1(n), x_2(n), x_3(n), x_4(n)]^T \quad (2)$$

Next, the high-resolution angle measurement unit 105 performs a unitary transformation on the correlation matrix $R_{xx}$, using a unitary matrix $Q_4$ expressed by the following expression (3), in accordance with the following expression (4). In the following expression (4), Re{ } is a function of taking the real part in { }. By performing a unitary transformation on the correlation matrix $R_{xx}$, the same effect as that of the F/B averaging is produced and the correlation matrix $R_{xx}$ is real-valued. As a result, the amount of arithmetic operation of signal processing following this process is reduced.

$$Q_4 = \frac{1}{\sqrt{2}}\begin{bmatrix} 1 & j & j & -1 \\ 1 & -j & j & 1 \\ 1 & j & -j & 1 \\ 1 & -j & -j & -1 \end{bmatrix} \quad (3)$$

$$R_{yy} = \text{Re}\{Q_4^H R_{xx} Q_4\} \tag{4}$$

Next, the high-resolution angle measurement unit 105 performs an eigenvalue expansion on the real-valued correlation matrix $R_{yy}$ in accordance with the following expression (5). In the following expression (5), a matrix E is one in which eigenvectors are arranged, and a diagonal matrix Λ is one in which eigenvalues are arranged as diagonal terms. $E^T$ is the transpose of the matrix E.

$$R_{yy} = E\Lambda E^T \tag{5}$$

The high-resolution angle measurement unit 105 estimates the wavenumber of the incoming signal from the distribution of eigenvalues acquired by performing an eigenvalue expansion on the correlation matrix $R_{yy}$, and separates the eigenvectors into signal subspace $E_S$ and noise subspace $E_N$. For example, the wavenumber of the incoming wave signal can be estimated from the number of detections of the incoming wave signal, the detections being based on determination using a threshold. As the threshold, a value acquired by multiplying the minimum eigenvalue by a preset constant value, or a mean value or geometric mean value of all the eigenvalues can be used.

In the unitary ESPRIT method, two subarrays #1 and #2 are extracted from the array antenna, and the angle of arrival of the radio wave is calculated by estimating a phase rotation matrix ϕ between the subarray #1 and the subarray #2. To estimate the phase rotation matrix ϕ, a transformation matrix W which associates the signal subspace $E_X$ of the subarray #1 with the signal subspace $E_Y$ of the subarray #2 is calculated.

In the 2D unitary ESPRIT method, to estimate the horizontal angle θ and the vertical angle ϕ simultaneously, relational expressions of the signal subspace of a subarray extracted horizontally, as shown in the following expressions (6) and (7), are used. The following expression (6) is a relational expression for calculating the signal subspace $E_{Xu}$ of the subarray #1 extracted horizontally using the signal subspace $E_S$ of the eigenvectors, and $K_{u2}$ is expressed by the following expression (8). Furthermore, the following expression (7) is a relational expression for calculating the signal subspace $E_{Yu}$ of the subarray #2 extracted horizontally using the signal subspace $E_S$ of the eigenvectors, and $K_{u2}$ is expressed by the following expression (9).

$$E_{Xu} = K_{u1} E_S \tag{6}$$

$$E_{Yu} = K_{u2} E_S \tag{7}$$

$$K_{ui} = \frac{1}{\sqrt{2}} \begin{bmatrix} 1 & 0 & 0 & 0 \\ 0 & 0 & 1 & 0 \end{bmatrix} \tag{8}$$

$$K_{u2} = \frac{1}{\sqrt{2}} \begin{bmatrix} 0 & -1 & 0 & 0 \\ 0 & 0 & 0 & -1 \end{bmatrix} \tag{9}$$

In addition, in the 2D unitary ESPRIT method, to estimate the horizontal angle θ and the vertical angle ϕ simultaneously, relational expressions of the signal subspace of a subarray extracted vertically, as shown in the following expressions (10) and (11), are used. The following expression (10) is a relational expression for calculating the signal subspace $E_{Xv}$ of the subarray #1 extracted vertically using the signal subspace $E_S$ of the eigenvectors, and $K_{v1}$ is expressed by the following expression (12). Furthermore, the following expression (11) is a relational expression for calculating the signal subspace $E_{Yv}$ of the subarray #2 extracted vertically using the signal subspace $E_S$ of the eigenvectors, and $K_{v2}$ is expressed by the following expression (13).

$$E_{Xv} = K_{v1} E_S \tag{10}$$

$$E_{Yv} = K_{v2} E_S \tag{11}$$

$$K_{v1} = \frac{1}{\sqrt{2}} \begin{bmatrix} 1 & 0 & 0 & 0 \\ 0 & 1 & 0 & 0 \end{bmatrix} \tag{12}$$

$$K_{v2} = \frac{1}{\sqrt{2}} \begin{bmatrix} 0 & 0 & -1 & 0 \\ 0 & 0 & 0 & -1 \end{bmatrix} \tag{13}$$

The high-resolution angle measurement unit 105 calculates a transformation matrix $\Psi_u$ associated with the subarray extracted horizontally from the following expression (14) and calculates a transformation matrix $\Psi_v$ associated with the subarray extracted vertically from the following expression (15), using the signal subspace of each subarray calculated as above.

$$\Psi_u = (E_{Xu}^T E_{Xu})^{-1} E_{Xu}^T E_{Yu} \tag{14}$$

$$\Psi_v = (E_{Xv}^T E_{Xv})^{-1} E_{Xv}^T E_{Yv} \tag{15}$$

Next, to save time and effort on pairing of the horizontal angle value and the vertical angle value, a transformation matrix $\Psi_{uv}$ is calculated from the following expression (16) which uses the transformation matrices $\Psi_u$ and $\Psi_v$.

$$\Psi_{uv} = \Psi_u + j\Psi_v \tag{16}$$

Next, the high-resolution angle measurement unit 105 estimates the phase rotation matrix ϕ shown in the following expression (18) by performing an eigenvalue expansion on the transformation matrix $\Psi_{uv}$ in accordance with the following expression (17).

$$\Psi_{uv} = T^{-1} \Phi T \tag{17}$$

$$\Phi = \begin{bmatrix} \varphi_1 & 0 \\ 0 & \varphi_2 \end{bmatrix} \tag{18}$$

The vertical angle $\phi_l$ is estimated from the following expression (19) using the eigenvalues shown in the above-mentioned expression (18), and the horizontal angle $\theta_l$ is estimated from the following expression (20). In this expression, l=1, 2.

$$\phi_l = \sin^{-1}\left(\frac{\lambda \tan^{-1} \varphi_l}{\pi d}\right) \tag{19}$$

$$\theta_l = \sin^{-1}\left(\frac{\lambda \tan^{-1} \varphi_l}{\pi d} \frac{1}{\cos \phi_l}\right) \tag{20}$$

In this way, the horizontal angle $\theta_1$ and the vertical angle $\phi_1$ of the direct wave of a radio wave received via the angle measurement antenna 104 are estimated. In Embodiment 1, as preprocessing before the eigenvalue expansion of the correlation matrix, only the F/B averaging is applied, but spatial averaging processing is not applied. In this case, the maximum number of incident waves on which the suppression of the correlation can be performed is two, and correspond to 1=1 and 1=2. More specifically, although the two angles are calculated, which one of these angles corresponds to the direct wave is usually unknown. Therefore, in Embodiment 1, either of the following two methods is applied. One of the methods is to determine whether or not which one of all the angle measurement values is included in the communication area, without making a distinction between the direct wave and the reflected wave. The other method is to determine the direct wave and the reflected wave on the basis of the magnitude of the estimated reception power, and determine whether or not the direct wave is included in the communication area.

It is known that a unitary transformation has the same correlation suppressing effect as that provided by the F/B averaging, and two signal eigenvalues are produced. The high-resolution angle measurement unit 105 calculates a matrix $S_r$ from the following expression (21) using a matrix $\Lambda_S$ in which the signal eigenvalues are arranged as diagonal terms, and a noise eigenvalue $\sigma_N$ which is either an eigenvalue of things other than the signal or an average of eigenvalues of things other than the signal. After calculating the matrix $S_r$, the high-resolution angle measurement unit 105 calculates the estimated values of radio wave strength of the direct and reflected waves of the radio wave using $P_{S1}$ and $P_{S2}$ which are the diagonal terms of the matrix $S_r$.

$$S_r = T(\Lambda_S - \sigma_N I)T^T \tag{21}$$

Next, the communication determination unit 106 determines whether or not to enable communications with the on-board unit, on the basis of the on-board unit ID and the RSSI (radio wave receive strength) which are detected from the radio wave received via the communication antenna 101, the on-board unit ID detected from the radio wave received via the angle measurement antenna 104, and the angle of arrival and the receive strength of the direct wave and the angle of arrival and the receive strength of the reflected wave, which are estimated from the latter radio wave (step ST3). For example, the communication determination unit 106 compares the receive strength of the radio wave received via the communication antenna 101 with a preset reference value (described as a threshold hereinafter), to determine whether or not the receive strength exceeds the threshold. When the receive strength of the radio wave does not exceed the threshold, the communication determination unit 106 determines that communications with the on-board unit which is the transmission source of this radio wave are disabled.

When the demodulation unit 103*b* and the high-resolution angle measurement unit 105 are operating asynchronously, it is necessary to, even though radio waves whose receive strengths exceed the threshold are received, check whether the demodulation unit 103*b* and the high-resolution angle measurement unit 105 process radio waves transmitted from an identical on-board unit. To that end, the communication determination unit 106 determines whether or not there is a match between the on-board unit ID which is detected by the demodulation unit 103*b* from a radio wave whose receive strength exceeds the threshold, and the on-board unit ID which is detected by the high-resolution angle measurement unit 105 from a radio wave whose receive strength exceeds the threshold. When determining that the on-board unit IDs differ from each other, the communication determination unit 106 determines that communications with both the on-board units are disabled.

However, in the case where the demodulation unit 103*b* and the high-resolution angle measurement unit 105 synchronously process a radio wave transmitted from an identical on-board unit, or in the case where it is clear that even though the demodulation unit 103*b* and the high-resolution angle measurement unit 105 are not in synchronization with each other, both of them process radio waves transmitted from an identical on-board unit, the determination of whether or not there is a match between on-board unit IDs is omitted. More specifically, in the road-to-vehicle communication method according to Embodiment 1, the detection of an on-board unit ID by the demodulation unit 103*b* and the detection of an on-board unit ID by the high-resolution angle measurement unit 105 can be omitted.

Furthermore, the communication determination unit 106 may perform the determination, as mentioned above, of whether or not there is a match between the on-board unit IDs, when a condition in which the number of times that the receive strength of the radio wave received, via the communication antenna 101, from the on-board unit exceeds the threshold exceeds a reference number of times is met.

In addition, when multiple on-board unit IDs are detected from radio waves received via the angle measurement antenna 104, the communication determination unit 106 may proceed to the next processing when a condition in which there is a match between on-board unit IDs whose number exceeds a reference number, out of the multiple on-board unit IDs, and the on-board unit ID detected by the demodulation unit 103*b* is met.

For example, in the case where the angle measurement antenna 104 includes four element antennas 107, the high-resolution angle measurement unit 105 detects an on-board unit ID from a radio wave received via each of the four element antennas 107. Therefore, four on-board unit IDs are outputted to the communication determination unit 106. The communication determination unit 106 proceeds to the next processing when a condition in which there is a match between on-board unit IDs whose number exceeds the reference number, out of the four on-board unit IDs, and the on-board unit ID detected by the demodulation unit 103*b* is met.

When there is a match between the on-board unit ID detected by the demodulation unit 103*b* and an on-board unit ID detected by the high-resolution angle measurement unit 105, the communication determination unit 106 notifies the high-resolution angle measurement unit 105 of this determination result. When receiving this notification, the high-resolution angle measurement unit 105 separates the radio wave from which the on-board unit ID matching the on-board unit ID detected by the demodulation unit 103*b* is detected into a direct wave and a reflected wave, and performs angle measurements.

The communication determination unit 106 stores the angle measurement values calculated by the high-resolution angle measurement unit 105, and determines whether or not the number of stored angle measurement values is equal to or greater than L. If the number of stored angle measurement values is equal to or greater than L, then the communication determination unit 106 determines whether or not k or more measured values, out of the L or more stored angle measurement values, show an arrival from the communication area.

In the angle measurements by the high-resolution angle measurement unit 105, there is a possibility that the suppression of the correlation between the direct wave and the reflected wave is insufficient according to a relation between the angles, amplitudes, or phases of the direct and reflected waves, and it is predicted that the insufficiency of the correlation suppression causes variations in the angle measurement values. Accordingly, if the number of angle measurement values, out of the L or more stored angle measurement values, showing an arrival from the communication area is less than k, then the communication determination unit 106 notifies the communication processing unit 102 that communications with the on-board unit which is the transmission source of this radio wave are disabled (communications disabled), as explained above. In contrast, if k or more measured values show an arrival from the communication area, then the communication determination unit 106 notifies the communication processing unit 102 that communications with the on-board unit which is the transmission source of the radio wave are enabled (communications OK).

When receiving a notification showing that communications with the on-board unit are enabled from the communication determination unit 106, the communication processing unit 102 communicates with the on-board unit using the communication antenna 101 (step ST4). For example, the communication unit 103a outputs a BST signal which is a signal for communications with the on-board unit to the communication antenna 101. The communication antenna 101 transmits the BST signal toward the on-board unit. In contrast, when receiving a notification showing that communications with the on-board unit are disabled from the communication determination unit 106, the communication processing unit 102 does not communicate with the on-board unit.

If the receive strength of the radio wave detected by the demodulation unit 103b exceeds the threshold, and if the number of times that the angle measurement value of either the direct wave or reflected wave of a radio wave, the angle measurement value being estimated by the high-resolution angle measurement unit 105, shows an arrival from the communication area exceeds the reference number of times, the communication determination unit 106 may determine that communications with the on-board unit are enabled.

Furthermore, the high-resolution angle measurement unit 105 may determine one having a larger estimated value of radio wave strength, out of two waves into which a radio wave received via the angle measurement antenna 104 from the on-board unit is separated, as the direct wave, and determine the other one having a smaller estimated value of radio wave strength as the reflected wave, and calculate the angle measurement values of only the direct wave. At this time, when the angle measurement values of the direct wave show an arrival from the communication area, the communication determination unit 106 may determine that communications with the on-board unit are enabled. Even though the processing is performed in this way, erroneous communications with on-board units other than the target for communications can be avoided.

Next, a hardware configuration which implements the functions of the roadside communication device 100 will be explained.

The functions of the communication processing unit 102, the high-resolution angle measurement unit 105, and the communication determination unit 106 which are included in the roadside communication device 100 are implemented by processing circuitry. More specifically, the roadside communication device 100 includes the processing circuitry for performing the processes of steps ST1 to ST4 shown in FIG. 5. The processing circuitry may be either hardware for exclusive use or a central processing unit (CPU) that executes a program stored in a memory.

Figure 6A:
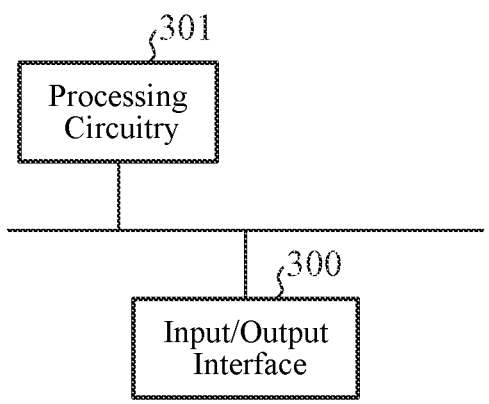
FIG. 6A is a block diagram showing a hardware configuration for implementing the functions of the roadside communication device according to Embodiment 1.
Figure 6B:
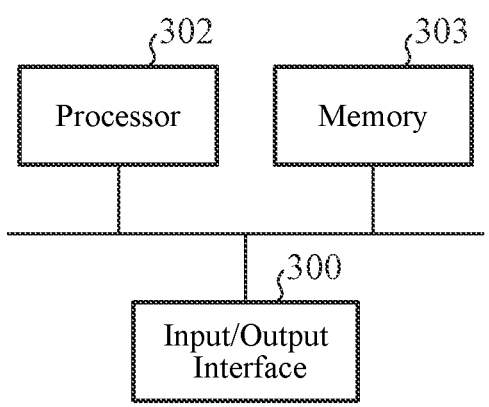
FIG. 6B is a block diagram showing a hardware configuration for executing software for implementing the functions of the roadside communication device according to Embodiment 1.

FIG. 6A is a block diagram showing a hardware configuration which implements the functions of the roadside communication device 100. FIG. 6B is a block diagram showing a hardware configuration which executes software which implements the functions of the roadside communication device 100. In FIGS. 6A and 6B, an input/output interface 300 relays signals exchanged between the roadside communication device 100 and on-board units via the antennas.

In the case where the processing circuitry is hardware for exclusive use shown in FIG. 6A, processing circuitry 301 is, for example, a single circuit, a composite circuit, a programmable processor, a parallel programmable processor, an application specific integrated circuit (ASIC), a field-programmable gate array (FPGA), or a combination of these circuits. The functions of the communication processing unit 102, the high-resolution angle measurement unit 105, and the communication determination unit 106 may be implemented by separate processing circuits or may be implemented collectively by a single processing circuit.

In the case where the processing circuitry is a processor 302 shown in FIG. 6B, the functions of the communication processing unit 102, the high-resolution angle measurement unit 105, and the communication determination unit 106 are implemented by software, firmware, or a combination of software and firmware. The software or the firmware is described as programs and the programs are stored in a memory 303.

The processor 302 implements the functions of the communication processing unit 102, the high-resolution angle measurement unit 105, and the communication determination unit 106 by reading and executing the programs stored in the memory 303. More specifically, the roadside communication device 100 includes the memory 303 for storing the programs by which the processes of steps ST1 to ST4 shown in FIG. 5 are performed as a result when the program is executed by the processor 302. These programs cause a computer to perform procedures or methods performed in the communication processing unit 102, the high-resolution angle measurement unit 105, and the communication determination unit 106. The memory 303 may be a computer readable storage medium in which the programs for causing a computer to function as the communication processing unit 102, the high-resolution angle measurement unit 105, and the communication determination unit 106 are stored.

The memory 303 is, for example, a non-volatile or volatile semiconductor memory, such as a random access memory (RAM), a read only memory (ROM), a flash memory, an erasable programmable read only memory (EPROM), or an electrically-EPROM (EEPROM), a magnetic disc, a flexible disc, an optical disc, a compact disc, a mini disc, a DVD, or the like.

Part of the functions of the communication processing unit 102, the high-resolution angle measurement unit 105, and the communication determination unit 106 may be implemented by hardware for exclusive use, and part of the functions may be implemented by software or firmware. For example, the functions of the high-resolution angle measurement unit 105 and the communication determination unit 106 may be implemented by the processor 302's reading and executing programs stored in the memory 303, and the function of the communication processing unit 102 may be implemented by a processing circuit as hardware for exclusive use. In this way, the processing circuitry can implement each of the above-mentioned functions by using hardware, software, firmware, or a combination of hardware, software and firmware.

As explained above, in the roadside communication device 100 according to Embodiment 1, on the basis of the on-board unit ID detected from a radio wave received via the communication antenna 101 and the receive strength of the radio wave, the on-board unit ID detected from a radio wave received via the angle measurement antenna 104, and the angle of arrival and the receive strength of a direct wave, and the angle of arrival and the receive strength of a reflected wave, the angles of arrival and the receive strengths being estimated from the latter radio wave, whether or not to enable communications with an on-board unit using the communication antenna 101 is determined. As a result, even when a radio wave transmitted from an on-board unit is received in a state where a direct wave and a reflected wave of the radio wave are mixed, erroneous communications with on-board units other than the target for communications can be avoided.

Embodiment 2

Figure 7:
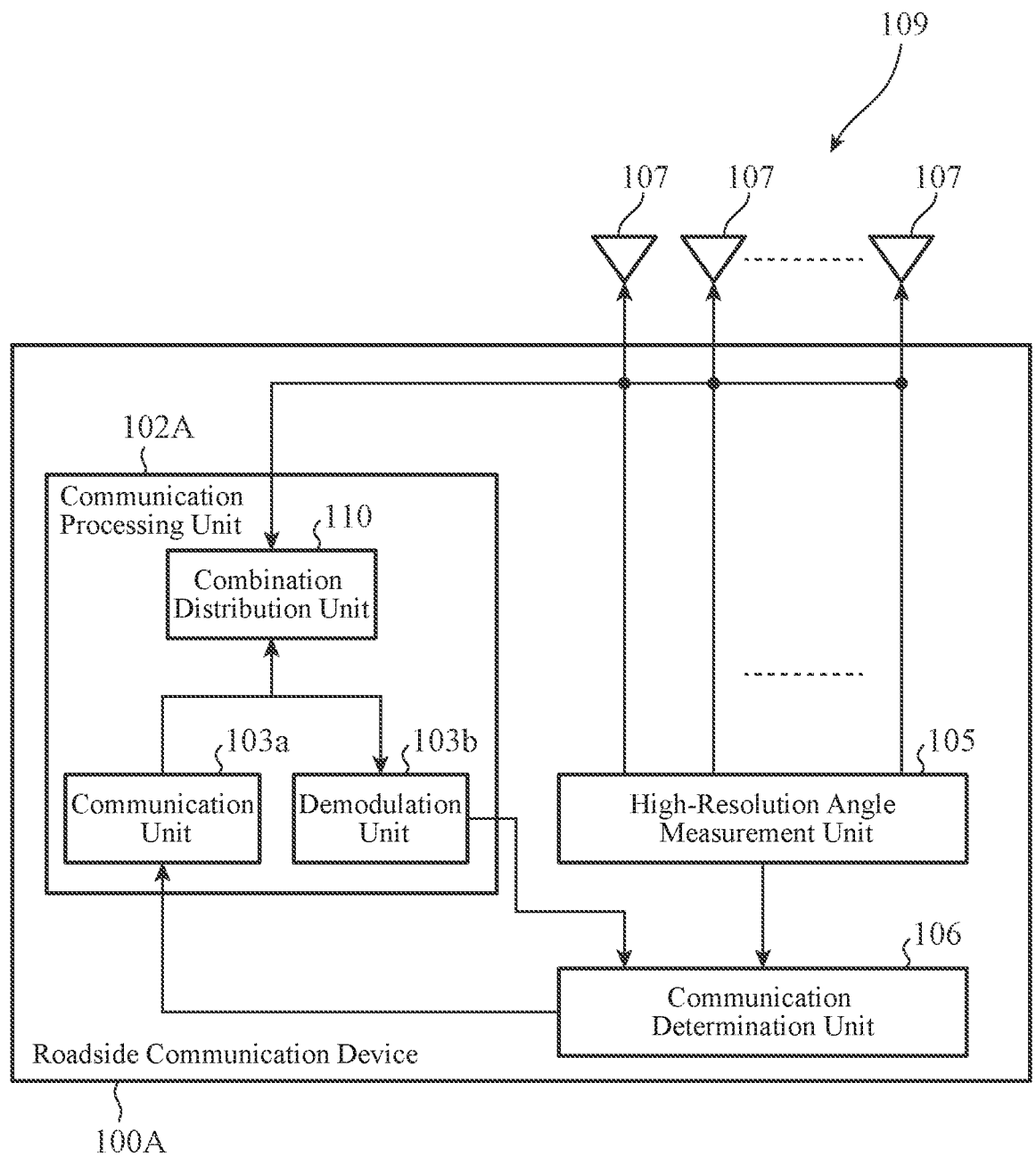
FIG. 7 is a block diagram showing the configuration of a roadside communication device according to Embodiment 2.

FIG. 7 is a block diagram showing the configuration of a roadside communication device 100A according to Embodiment 2, and the same components as those in FIG. 1 are denoted by the same reference signs and an explanation of the components will be omitted hereinafter. The roadside communication device 100A differs from the roadside communication device 100 according to Embodiment 1 in that a single array antenna is shared between a communication antenna and an angle measurement antenna.

The array antenna 109 includes multiple element antennas 107. A high frequency signal received via each of the multiple element antennas 107 which constitute the array antenna 109 is outputted to a combination distribution unit 110 and a high-resolution angle measurement unit 105. The combination distribution unit 110 performs analog combining of the high frequency signal received via each of the multiple element antennas 107, and distributes a transmission signal transmitted from a communication unit 103a to each of the multiple element antennas 107 which constitute the array antenna 109, thereby causing the element antennas to transmit the transmission signal toward an on-board unit.

Figure 8:
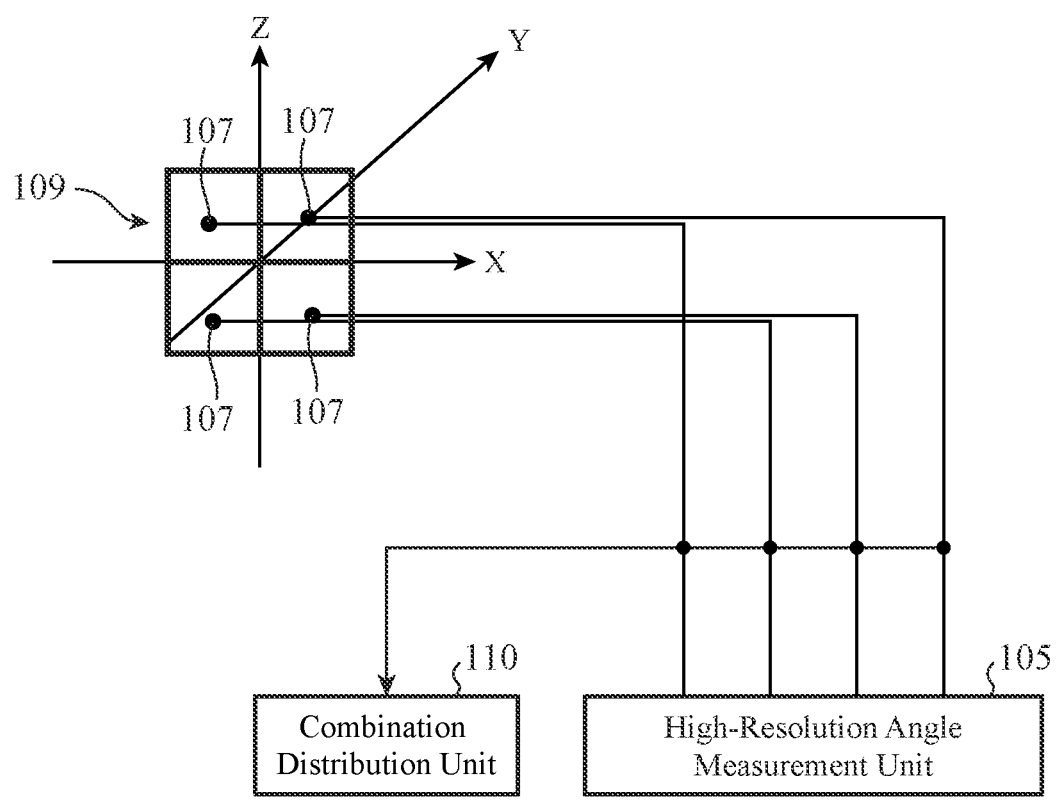
FIG. 8 is an outline diagram showing an overview of a connection relationship among the array antenna composed of four element antennas, a combination distribution unit, and a high-resolution angle measurement unit.

FIG. 8 is an outline diagram showing an overview of a connection relationship among the array antenna 109 which includes four element antennas 107, the combination distribution unit 110, and the high-resolution angle measurement unit 105. When the array antenna 109 is made to function as the communication antenna, the combination distribution unit 110 combines high frequency signals received via the array antenna 109, and distributes a signal transmitted from the communication unit 103a to the array antenna 109. The array antenna 109 has a beam width and a gain of an aperture where the four element antennas 107 are combined.

When the array antenna 109 is made to function as the angle measurement antenna, high frequency signals received via the array antenna 109 are outputted to the high-resolution angle measurement unit 105 without being sent to the combination distribution unit 110. For example, in the case where the array antenna 109 includes four element antennas 107, four signals are transmitted to the high-resolution angle measurement unit 105, and angle measurement processing on direct and reflected waves of these signals is performed, like in the case of Embodiment 1.

The functions of a communication processing unit 102A, the high-resolution angle measurement unit 105, and a communication determination unit 106 which are included in the roadside communication device 100A are implemented by a processing circuit. More specifically, the roadside communication device 100A includes a processing circuit for performing processes in steps ST1 to ST4 shown in FIG. 5. The processing circuit may be either the processing circuit 301 shown in FIG. 6A which is hardware for exclusive use or the processor 302 shown in FIG. 6B which executes programs stored in the memory 303.

As mentioned above, in the roadside communication device 100A according to Embodiment 2, the array antenna 109 has the functions of both the communication antenna 101 and the angle measurement antenna 104 which are shown in Embodiment 1. Because the functions of the communication antenna 101 and the angle measurement antenna 104 are implemented by the single array antenna 109, the device scale of the roadside communication device 100A can be reduced. In addition, because the communication processing unit 102A, the high-resolution angle measurement unit 105, and the communication determination unit 106 operate like those of Embodiment 1, the same advantages as those by Embodiment 1 are provided.

It is to be understood that the present disclosure is not limited to the above-mentioned embodiments, and any combination of two or more of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

Because the roadside communication device according to the present disclosure can avoid erroneous communications with on-board units which are not the target for communications even when a direct wave of a radio wave sent out from an on-board unit is received in a mixed state with reflected waves, the roadside communication device can be used for, for example, road-to-vehicle communication systems for ETC (registered trademark) in which multiple traveling lanes are adjacent.

REFERENCE SIGNS LIST 100, 100A roadside communication device, 101 communication antenna, 102, 102A communication processing unit, 103a communication unit, 103b demodulation unit, 104 angle measurement antenna, 105 high-resolution angle measurement unit, 106 communication determination unit, 107 element antenna, 108 array center, 109 array antenna, 110 combination distribution unit, 200, 201 vehicle, 200a, 201a on-board unit, 202 to 205 area, 206 booth, 300 input/output interface, 301 processing circuit, 302 processor, and 303 memory.

The invention claimed is:

1. A roadside communication device connected to a first antenna used for communications with an on-board unit, and to a second antenna used for estimating angles of arrival of radio waves, the roadside communication device comprising:
processing circuitry
to detect a receive strength of a radio wave received via the first antenna from a first on-board unit;
to estimate an angle of arrival and a receive strength of a direct wave and an angle of arrival and a receive strength of a reflected wave, the direct wave and the reflected wave being included in one or more radio waves received via the second antenna from one or more on-board units; and
to determine whether or not to enable communications with the first on-board unit, using the first antenna, on a basis of the detected receive strength, and the estimated angles of arrival and the estimated receive strengths of the direct and reflected waves of the one or more radio waves,
wherein if the detected receive strength exceeds a reference value, and if the estimated angle of arrival of either the direct wave or reflected wave of the radio wave shows an arrival from a communication area, then the processing circuitry determines that communications with the first on-board unit are enabled.

2. The roadside communication device according to claim 1, wherein the processing circuitry detects first on-board unit identification information from the radio wave received via the first antenna,
   detects second on-board unit identification information from the one or more radio waves received via the second antenna, and
   determines whether or not to enable communications with the first on-board unit, on a basis of the detected first on-board unit identification information and the detected receive strength, the detected second on-board unit identification information, and the estimated angles of arrival and the estimated receive strengths of the direct and reflected waves of the one or more radio waves.

3. A roadside communication device connected to an array antenna, comprising:
   processing circuitry
   to combine radio waves received via multiple element antennas, which constitute the array antenna, from a first on-board unit and detect a receive strength of the combined radio waves;
   to estimate an angle of arrival and a receive strength of a direct wave and an angle of arrival and a receive strength of a reflected wave, the direct wave and the reflected wave being included in one or more radio waves received via the multiple element antennas from one or more on-board units; and
   to determine whether or not to enable communications with the first on-board unit, using the array antenna, on a basis of the detected receive strength, and the estimated angles of arrival and the estimated receive strengths of the direct and reflected waves of the one or more radio waves,
   wherein if the detected receive strength exceeds a reference value, and if the estimated angle of arrival of either the direct wave or reflected wave of the radio wave shows an arrival from a communication area, then the processing circuitry determines that communications with the first on-board unit are enabled.

4. The roadside communication device according to claim 3, wherein the processing circuitry detects first on-board unit identification information from the radio wave received via the first antenna,
   detects second on-board unit identification information from the one or more radio waves received via the second antenna, and
   determines whether or not to enable communications with the first on-board unit, on a basis of the detected first on-board unit identification information and the detected receive strength, the detected second on-board unit identification information, and the estimated angles of arrival and the estimated receive strengths of the direct and reflected waves of the one or more radio waves.

5. A road-to-vehicle communication method for a roadside communication device connected to a first antenna used for communications with an on-board unit, and a second antenna used for estimating an angle of arrival of a radio wave, the road-to-vehicle communication method comprising:
   detecting a receive strength of a radio wave received via the first antenna from a first on-board unit;
   estimating an angle of arrival and a receive strength of a direct wave and an angle of arrival and a receive strength of a reflected wave, the direct wave and the reflected wave being included in one or more radio waves received via the second antenna from one or more on-board units;
   determining whether or not to enable communications with the first on-board unit, using the first antenna, on a basis of the detected receive strength, and the estimated angles of arrival and the estimated receive strengths of the direct and reflected waves of the one or more radio waves;
   determining that communications with the first on-board unit are enabled, if the detected receive strength exceeds a reference value, and if the estimated angle of arrival of either the direct wave or reflected wave of the radio wave shows an arrival from a communication area; and
   communicating with the first on-board unit via the first antenna in accordance with the determined result.

6. The road-to-vehicle communication method according to claim 5, the method further comprising:
   detecting first on-board unit identification information from the radio wave received via the first antenna;
   detecting second on-board unit identification information from the one or more radio waves received via the second antenna; and
   determining whether or not to enable communications with the first on-board unit, on a basis of the detected first on-board unit identification information and the detected receive strength, the detected second on-board unit identification information, and the estimated angles of arrival and the estimated receive strengths of the direct and reflected waves of the one or more radio waves.

* * * * *